United States Patent [19]

Smith

[11] 4,267,137
[45] May 12, 1981

[54] METHOD FOR MOLDING SHEET MATERIAL WITH PARALLEL RIBS ON ONE SIDE

[75] Inventor: J. Harold Smith, Amherst, Mass.

[73] Assignee: United Technologies Corporation, Hartford, Conn.

[21] Appl. No.: 968,600

[22] Filed: Dec. 11, 1978

[51] Int. Cl.² ............................................. D04H 1/16
[52] U.S. Cl. ................................... 264/113; 264/122; 264/120
[58] Field of Search ............... 264/109, 105, 122, 113, 264/120

[56] References Cited

U.S. PATENT DOCUMENTS

| | | | |
|---|---|---|---|
| 3,901,960 | 8/1975 | Holloway | 264/105 |
| 4,119,692 | 10/1978 | Durinck | 264/109 |

Primary Examiner—Donald J. Arnold
Assistant Examiner—James R. Hall
Attorney, Agent, or Firm—Stephen E. Revis

[57] ABSTRACT

In fabricating sheet material with closely spaced parallel ribs on one side, a mold with ribbed shaped grooves is uniformly filled with a loose, dry molding material using a coater with a plurality of adjacent blades extending therefrom with the blade tips parallel to and preferably in contact with the mold top surface. The coater is swept across the mold top surface and the blades distribute and compress the molding material into the mold grooves. The invention is particularly useful for molding materials with high fiber content which are difficult to pack uniformly and with sufficient density into the mold.

10 Claims, 7 Drawing Figures

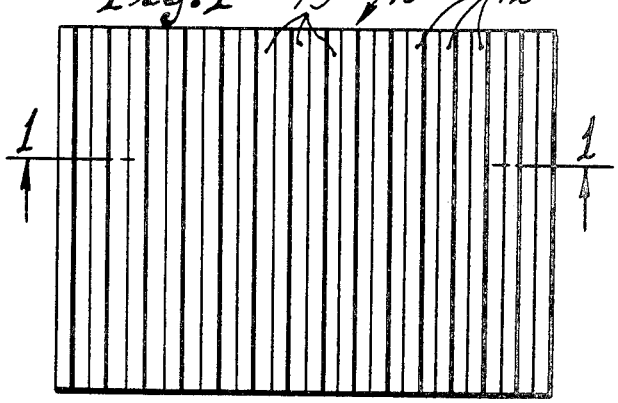
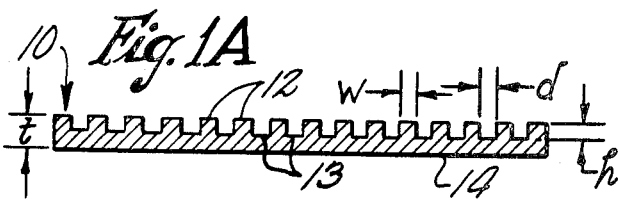
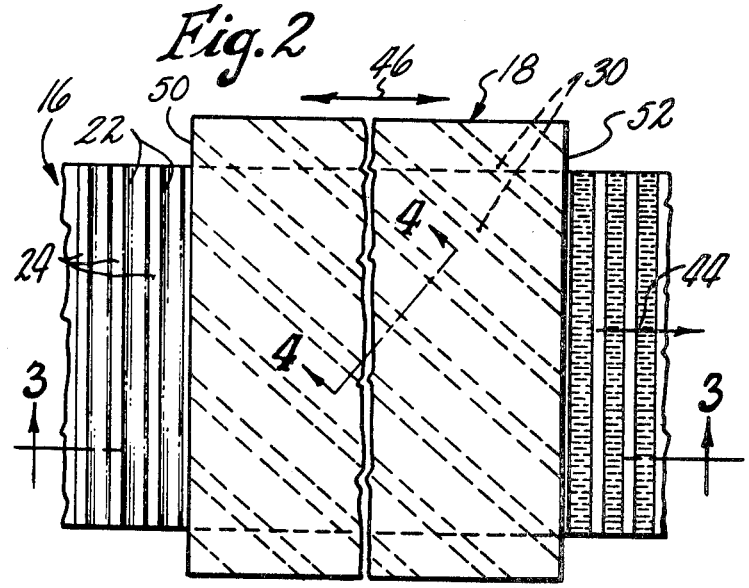

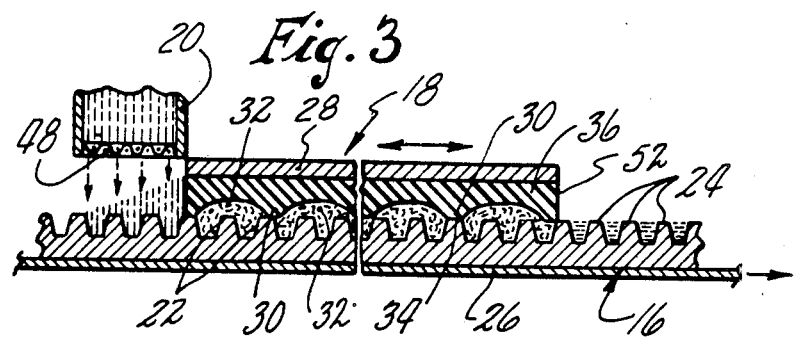
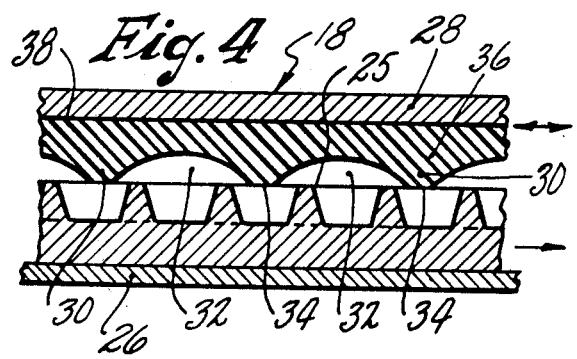
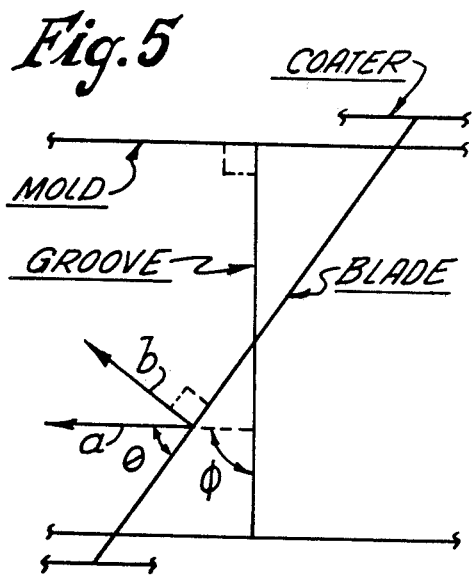
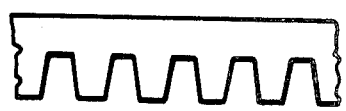
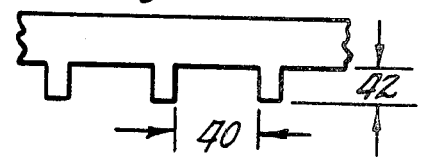

METHOD FOR MOLDING SHEET MATERIAL WITH PARALLEL RIBS ON ONE SIDE

BACKGROUND OF THE INVENTION

1. Field of the Invention

This invention relates to a process for molding articles.

2. Description of the Prior Art

It is desirable to be able to fabricate, by a low cost process, sheet material having closely spaced narrow ribs extending thereacross wherein the sheets have uniform properties throughout and perhaps a higher density in the rib portion. In the molding of such an article problems result from the fact that it is difficult to uniformly fill and compact a powder mixture within the rib forming grooves of the mold. This is even more of a problem when the molding material contains fibers since the material is not free flowing because the fibers tend to log jam as the material is being sifted and spread into the narrow grooves. Hidden voids can occur within the grooves, and these voids do not necessarily disappear when the material is compacted such as with a flat plate punch or with a roller. A punch or roller does not pack the material into the grooves with adequate density and uniformity; and often the result is a higher density in the web portion of the finished article as compared to the rib portion. All of these problems become accentuated as the fiber content of the molding material increases.

One application for ribbed sheet material is as a fuel cell electrode substrate wherein a suitable catalyst is disposed on the non-ribbed surface of the sheet. Electrodes comprising ribbed substrates are described in commonly owned U.S. Pat. No. 4,115,627. One method for making ribbed fuel cell substrates is described in commonly owned U.S. Patent Application Ser. No. 824,758 titled "Method for Fabricating a Ribbed Electrode Substrate" by G. Sandelli filed on Aug. 15, 1977. In the one specific example set forth in that application the molding material comprises 20% resin and 80% carbon fibers. This mixture is sifted through a screen into a molding die having the mirror image of the rib pattern desired in the substrate. The mixture is pressed to a preset thickness by a flat plate punch and is then heat treated. The finished part had a porosity of approximately 90% in the ribs and 65% in the connecting web portions despite it being preferable to have more uniform characteristics throughout the substrate.

SUMMARY OF THE INVENTION

One object of the present invention is a method and apparatus for forming ribbed sheet material.

A more specific object of the present invention is a method and apparatus for uniformly filling and compacting a dry molding material into a mold for making ribbed sheet material.

A further object of the present invention is a method and apparatus for molding ribbed, fibrous sheet material having substantially uniform density throughout.

According to the present invention, in the method of molding sheet material with closely spaced parallel ribs on one side thereof using a mold with rib shaped grooves therein and lands between the grooves defining a top surface of the mold, a coater having a plurality of adjacent blades spaced apart with their tips parallel to and in contact with or in close proximity to the mold top surface is moved relative to the mold such that the blade tips sweep across the mold top surface, and the mold grooves are repeatedly filled to excess with dry molding material between the time adjacent blade tips pass over them.

In principle the apparatus operates by repeatedly and automatically overfilling the grooves and subsequently compacting some of the excess material into the grooves by the action of blades passing over the grooves. A major feature of the invention is the great number of filling/compacting operations which may be accomplished with even a single pass of the multi-bladed coater over a groove. Another important feature and advantage of the present invention is its ability to handle and uniformly compact high fiber content molding material as well as 100% particulate material.

In accordance with one embodiment of the present invention, channels are defined between adjacent blades and become filled or partially filled with molding material during operation of the apparatus. As a coater blade passes over a groove in the mold it simultaneously levels off and somewhat compresses or compacts the material within the groove. Some of the excess material may slide under the blade and some may be pushed in front of the blade. The channel directly behind the blade then passes over the groove and some of the material which has accumulated in that channel is deposited or falls loosely on top of the material already in the groove. The next blade then passes over the groove and further compacts and again levels off the material in the groove by pressing down somewhat on the new material deposited therein from the preceding channel. Continuing in like fashion, each channel deposits additional material on top of the material already in the groove, and the immediately following blade provides additional compaction and leveling. The coater may be weighted or spring loaded to provide any desired pressure of the blades against the mold surface.

The relative motion between the mold and coater may be accomplished by moving either or both of them. For example the coater may be fixed with the mold moving under it on a conveyor belt. If a single pass under the coater does not provide the necessary degree of compaction the coater may be reciprocated over the mold to simulate any desired number of passes. Compacting will continue witin a groove or portion of a groove until either (1) blades no longer pass over the groove; (2) a steady state is reached whereby the downward force exerted by the blade on the material within the groove is no longer sufficient to cause further compaction, or (3) all material deposited on the mold has been compacted into the grooves.

In a preferred embodiment the channels between blades are arcuate in cross section and wider then they are deep, with their width increasing outwardly from the maximum depth of the channel to the blade tips. This prevents or reduces the extent to which the mold material becomes compacted and immobile or clogged within the coater channels.

It is also preferred that the surface of each channel, where it meets the blade tip, forms an angle of substantially less than 90 degrees to the plane of the mold top surface. This also helps reduce compaction or clogging within the channel and it puts an additional downward component of force (i.e., a compacting force) on the material within the mold groove.

The angular relationship between the blades and grooves in conjunction with the direction of motion of the blades relative to the mold also has an effect on how well the present method works. Theoretically, however, there are only two non-workable configurations. These are when the coater moves in a direction, relative to the mold, which is either parallel to the grooves or parallel to the blades. More practical and preferred boundaries are set forth in the Description of Preferred Embodiments.

After the grooves are filled and compacted by the above described apparatus, a layer of molding material is applied over the filled grooves and lands. This material will form the flat surface of the sheet material and the webs which interconnect the ribs. This new material is compacted by conventional means such as a roller or flat plate punch. Since the rib material is already firmly compacted within the mold grooves, appropriate selection of the punch pressure can result in substantially equivalent density in both the ribs and webs or even greater density in the ribs, if desired.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 1 is a top view of a ribbed fuel cell electrode substrate such as may be made by the apparatus and method of the present invention.

FIG. 1A is a cross-sectional view taken along the line 1—1 in FIG. 1.

FIG. 2 is a simplified top view of apparatus used in the method of the present invention.

FIG. 3 is a cross-sectional view taken along the line 2—2 of FIG. 2.

FIG. 4 is a cross-sectional view taken along the line 4—4 of FIG. 2.

FIG. 5 is a diagram used to explain the angular relationship between the moving parts of the apparatus used in the method of the present invention.

FIGS. 6 and 7 are cross sections showing alternate coater blade configurations suitable for use in the method of the present invention.

DESCRIPTION OF PREFERRED EMBODIMENTS

FIGS. 1 and 1A show a fuel cell electrode substrate 10 which may be made using the method and apparatus of the present invention. The substrate 10, when finished and completely heat treated, is substantially all graphite; however, it is molded from a composition comprising at least 50% chopped carbon fibers and 10-50% particulate thermosetting resin, such as phenolic resin. The substrate preferably comprises a high percentage of carbon fibers, such as on the order of 70%, in order to obtain high porosity of at least 75%. Nominal carbon fiber diameter and length may be 0.0004 inch and 0.007 inch, respectively.

The substrate 10, in this embodiment, is rectangular in shape and has ribs 12 extending thereacross on one side thereof and a flat surface 14 on the opposing side. The ribs 12 are separated by webs 13. In forming a fuel cell electrode, a catalyst layer is applied to the surface 14. The area of the surface 14 may be anywhere from a few square inches to ten square feet or more, depending on the size of the fuel cell into which it is to be incorporated. The substrate is usually made as thin as possible consistent with strength and functional requirements. A preferred thickness t is 0.085 with the ribs having a width w, a height h, and a distance d therebetween of 0.066 inch, 0.070 inch, and 0.094 inch, respectively.

Referring now to FIGS. 2-4, apparatus for molding the substrate 10 comprises a mold 16, a coater 18, and a material feeder 20 (the feeder 20 is not shown in FIG. 2 for the purpose of clarity). The mold 16 includes grooves 22 having a size, shape and spacing which is substantially the same as the size, shape and spacing of the ribs 12. Lands 24 between the grooves 22 are in a common plane forming the top surface 25 (FIG. 4) of the mold 16. The mold 16 rests upon a support which in this embodiment is a conveyor belt 26.

The coater 18 includes a rigid support plate 28 having a plurality of blades 30 extending outwardly therefrom defining a plurality of parallel channels 32 therebetween. The blade tips 34 extend parallel to and are in frictional engagement with the top surface 25 of the mold. The blades are formed from one continuous piece 36 of nonself-supporting rubber which is bonded at the surface 38 to the support plate 28. The blades are therefore somewhat flexible at or near their tips. The blades could just as well be made from metal and be rigid.

The shape of the channels 32 and blades 30 of this embodiment is best shown in FIG. 4 which is a cross section taken through the coater 18 in a direction perpendicular to the blades. The channels are arcuate; and the surfaces 40, which they adjoin the blade tips 34, form angles of about 45 degrees with the plane of the lands 24. While an angle of 90 degrees is workable, it is believed that an angel of 60 degrees or less would work better since a downward component of force is provided on the molding material as the coater and mold move with respect to one another. Sloped sides also reduce the tendency of the channels to clog with material. While the arcuate shape shown in FIG. 4 is preferred, other shapes, such as the shapes shown in FIGS. 6 and 7 are also suitable. A cross-sectional shape wherein the channels continuously increase in width from a point at their maximum depth out to the blade tips is preferred (FIG. 6). It is also preferred that the width 40 of the channels at the blade tips is greater than the channel depth 42 (FIG. 7). Most preferably the depth is no more than half the width. It is also preferred that the spacing between blades be at least on the same order of magnitude and most preferably greater than the maximum groove width. These features all help reduce compaction and clogging of material within the channels.

In the operation of the apparatus shown in this embodiment the conveyor belt 26 moves the mold 16 in the direction of the arrow 44, which is perpendicular to the grooves 22. At the same time the coater 18 is reciprocated parallel to the direction 44 as represented by the arrows 46. The blades 30 are oriented at an angle of 45 degrees with respect to the arrows 44, 46. Dry molding material in the feeder 20 is deposited onto the mold 16 through a screen 48 which forms the bottom of the feeder 20. The screen acts as a sifter and breaks up material which is clumped together. The motion of the conveyor belt moves the material toward the coater. Some of the material enters the channel openings in the front face 50 of the coater; some works its way under the blades; and a portion is compacted into the mold grooves by the coater blades. After a short start-up period the channels of the coater become filled and the mold grooves receive the proper amount of compacted mold material. By selection of variables, including conveyor speed, reciprocating coater motion, and material feed rate, a steady state may be readily achieved wherein the grooves are uniformly filled and compacted and virtually no excess material is in the mold as it passes out from under the rear face 52 of the coater.

Referring now to FIG. 5, assume that a vector A represents the direction in which the coater travels relative to the mold and parallel to the top surface thereof; and vector B is the component of vector A perpendicular to the blade. The angle $\theta$ formed between the vector A and the blade should be more than zero degrees to ensure that the blade "sweeps across" the mold top surface, which is essential to the present invention. From a more practical point of view it is felt that angle $\theta$ should be between about 15 degrees and 90 degrees so as to have a substantial component of motion (vector b) perpendicular to the blade. Forty-five degrees is the preferred angle for $\theta$.

In addition to the foregoing, and still with reference to FIG. 5, it is also essential that the grooves of the mold not be parallel to the vector A. If $\phi$ represents the angle formed between the vector A and a groove, it is recommended that $\phi$ be between 15 degrees and 90 degrees. An angle of 90 degrees is most preferred.

After filling the grooves and compacting the material therein in accordance with the teachings of the present invention, additional molding material (perhaps, but not necessarily the same molding material) is deposited in the mold over the lands and filled grooves. This material will form the flat surface 14 (FIG. 1) of the sheet 10 and also the connecting webs 13 between ribs. It is compacted by conventional means such as with a flat plate punch or by passing the mold under a roller. The amount of additional material added to the mold and the amount of pressure applied to compact this material is determined by the desired porosity within the webs and the overall thickness of the sheet. Although the roller or flat plate punch provides a larger force on material over the mold lands than on material within the grooves, this is counteracted by the extent to which the material within the grooves was previously compacted such that a uniform density throughout the structure may be obtained.

After this step of compaction with a roller or flat plate the material is heated to at least partially cure the resin such that the material can be removed from the mold while still retaining its molded shape. The part is then carbonized and graphitized in accordance with well known procedures.

A simple manual test was conducted to determine the extent to which a blend of 70% carbon fibers and 30% resin, by weight, could be compacted into a mold by the method of the present invention. The density of this material before compacting was approximately 0.41 g/cm$^3$. The mold had five channels machined therein each 12 inches long and having a one-eighth inch square cross section; the channels spaced one-eighth inch apart. The coater used was a section of a rubber floor mat having eight parallel ribs (i.e., knife edges in accordance with the present terminology) therein per inch. It had a cross section similar in appearance to the coater of FIG. 6. The overall coater thickness was 0.125 inch and the blade height 0.063 inch. A small amount of the blended materials placed on the mold and worked into the channels by rubbing the coater back and forth against the mold substantially in the direction of the mold grooves and with the coater blades oriented at an approximately 45 degree angle with respect to the grooves. Additional material was intermittently added and worked into the grooves until they were completely filled and no more material could be forced into them. Excess material was wiped from the top surface of the mold, and the compacted material was emptied from the mold grooves and weighed. Based on this weight and the known volume of the grooves the density of the material within the grooves was determined to be approximately 0.68 g/cm$^3$. Now a layer of the web material may be applied over the grooves and compacted by a flat plate punch or roller to a preheat treatment density as high as 0.68 g/cm$^3$. Since preheat treatment web densities of between 0.5 and 0.6 g/cm$^3$ are presently preferred, it is apparent that by controlling the amount of material compacted into the mold grooves, equivalent web and rib densities (before heat treatment) may be readily achieved.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a method for molding sheet material having closely spaced parallel ribs on one side thereof from dry, particulate, heat curable molding material using a mold and a coater, the coater being disposed above the mold, the mold comprising closely spaced parallel grooves therein having the shape of the ribs to be formed, said mold including lands between the grooves, said lands defining the top surface of the mold, said coater including a plurality of spaced apart parallel blades defining a plurality of parallel channels between said blades, said blades including tips parallel to said top surface of the mold and either in contact with said top surface or in close proximity thereto, the steps of:
    1. depositing dry particulate heat curable molding material onto said top surface of the mold and within said grooves;
    2. uniformly filling the grooves of said mold with said deposited molding material and uniformly compacting said deposited molding material within said grooves by moving the mold relative to the coater in a direction parallel to said top surface of the mold such that a vector representing the direction of motion of the coater relative to said top surface forms an angle of greater than zero degrees with the blades and with the mold grooves, wherein said step of moving the mold brings the said molding material in contact with the coater blades and between the coater and the mold, wherein said steps of depositing, filling and compacting are continued until the grooves are completely filled and no additional material can be forced into the grooves by the relative movement between the coater and the mold;
    3. after the step of uniformly filling the grooves and compacting said molding material within said grooves, applying a uniform layer of a dry particulate heat curable molding material over the filled grooves and over the lands of said mold;
    4. compacting said applied layer;
    5. then, heating the molding material within the grooves and the molding material in the compacted layer to at least partially cure said molding materials to form an at least partially cured ribbed sheet which can be removed from the mold while still retaining its molded shape;

6. removing the at least partially cured ribbed sheet material from the mold; and
7. fully curing said sheet material if not yet fully cured.

2. The method according to claim 1 wherein the grooves form an angle of between 15 degrees and 90 degrees with said vector and said blades are oriented at an angle of between 15 degrees and 90 degrees to said vector.

3. The method according to claim 2 wherein said blade tips are in frictional engagement with the top surface of the mold as the mold is moved relative to the coater.

4. The method according to claim 3 wherein said channels continuously increase in width from a point at their maximum depth to the blade tips.

5. The method according to claim 3 wherein said molding material comprises at least 50% carbon fibers, by weight, and up to 50% heat curable resin.

6. The method according to claim 3 wherein the mold grooves form an angle of 90 degrees with said vector and the blades are oriented at an angle of about 45 degrees to said vector.

7. The method according to claim 4 wherein the surfaces of said channels, where they intersect said blade tips in a cross section perpendicular to the length of the channel, form an angle of less than 60 degrees with the plane of the top surface of said mold.

8. The method according to claim 7 wherein said channel surfaces are arcuate.

9. The method according to claim 7 wherein said channels have a width at the blade tips which is at least twice their maximum depth.

10. The method according to claim 3 wherein said coater is reciprocated over the top surface of the mold to provide multiple passes of each blade over each groove.

* * * * *

UNITED STATES PATENT AND TRADEMARK OFFICE
CERTIFICATE OF CORRECTION

PATENT NO. : 4,267,137
DATED : May 12, 1981
INVENTOR(S) : J. Harold Smith

It is certified that error appears in the above—identified patent and that said Letters Patent is hereby corrected as shown below:

Column 2, line 46: "witin" should be --within--.

Column 4, line 28: "which" should be --where--.

Column 4, line 31: "angel" should be --angle--.

Signed and Sealed this

Fourth Day of August 1981

[SEAL]

Attest:

GERALD J. MOSSINGHOFF

*Attesting Officer*  *Commissioner of Patents and Trademarks*